United States Patent
McCown (10) Patent No.: US 8,214,298 B2
(45) Date of Patent: Jul. 3, 2012

(54) SYSTEMS AND METHODS FOR PERFORMING WIRELESS FINANCIAL TRANSACTIONS

(75) Inventor: Steven Harvey McCown, Rigby, ID (US)

(73) Assignee: RFinity Corporation, Idaho Falls, ID (US)

( * ) Notice: Subject to any disclaimer, the term of this patent is extended or adjusted under 35 U.S.C. 154(b) by 404 days.

(21) Appl. No.: 12/196,806

(22) Filed: Aug. 22, 2008

(65) Prior Publication Data

US 2009/0216681 A1 Aug. 27, 2009

Related U.S. Application Data

(60) Provisional application No. 61/031,605, filed on Feb. 26, 2008, provisional application No. 61/031,885, filed on Feb. 27, 2008.

(51) Int. Cl.
G06Q 20/00 (2012.01)
(52) U.S. Cl. .................. 705/67; 705/65; 705/64
(58) Field of Classification Search .............. 705/64–67
See application file for complete search history.

(56) References Cited

U.S. PATENT DOCUMENTS

| | | | |
|---|---|---|---|
| 6,779,115 B1 | 8/2004 | Naim | |
| 6,831,982 B1 | 12/2004 | Hughes et al. | |
| 7,024,395 B1 | 4/2006 | McCown et al. | |
| 7,734,933 B1 * | 6/2010 | Marek et al. | 713/193 |
| 7,979,316 B2 * | 7/2011 | Coelho et al. | 705/26.1 |
| 2002/0181710 A1 * | 12/2002 | Adam et al. | 380/270 |
| 2003/0093695 A1 * | 5/2003 | Dutta | 713/201 |
| 2003/0115454 A1 * | 6/2003 | Piikivi et al. | 713/155 |
| 2003/0154139 A1 * | 8/2003 | Woo | 705/26 |
| 2003/0172090 A1 * | 9/2003 | Asunmaa et al. | 707/200 |
| 2004/0029569 A1 * | 2/2004 | Khan et al. | 455/414.1 |
| 2004/0030601 A1 * | 2/2004 | Pond et al. | 705/16 |
| 2004/0030658 A1 * | 2/2004 | Cruz | 705/65 |
| 2004/0031856 A1 | 2/2004 | Atsmon et al. | |
| 2004/0107219 A1 | 6/2004 | Rosenberger | |
| 2004/0117623 A1 * | 6/2004 | Kalogridis et al. | 713/165 |
| 2004/0243517 A1 * | 12/2004 | Hansen | 705/64 |
| 2005/0038707 A1 | 2/2005 | Roever et al. | |
| 2005/0040951 A1 * | 2/2005 | Zalewski et al. | 340/572.1 |
| 2005/0068169 A1 | 3/2005 | Copley et al. | |
| 2005/0071179 A1 * | 3/2005 | Peters et al. | 705/1 |

(Continued)

OTHER PUBLICATIONS

Gódor et. al., "Mobile Payment", 2006.*

(Continued)

*Primary Examiner* — James A Reagan
*Assistant Examiner* — Calvin Cheung
(74) *Attorney, Agent, or Firm* — SNR Denton US LLP (57) ABSTRACT

A secure computing module (SCM) is configured for connection with a host device. The SCM includes a processor for performing secure processing operations, a host interface for coupling the processor to the host device, and a memory connected to the processor wherein the processor logically isolates at least some of the memory from access by the host device. The SCM also includes a proximate-field wireless communicator connected to the processor to communicate with another SCM associated with another host device. The SCM generates a secure digital signature for a financial transaction package and communicates the package and the signature to the other SCM using the proximate-field wireless communicator. Financial transactions are performed from person to person using the secure digital signature of each person's SCM and possibly message encryption. The digital signatures and transaction details are communicated to appropriate financial organizations to authenticate the transaction parties and complete the transaction.

12 Claims, 6 Drawing Sheets

U.S. PATENT DOCUMENTS

| | | | |
|---|---|---|---|
| 2005/0071269 A1* | 3/2005 | Peters | 705/40 |
| 2005/0120225 A1 | 6/2005 | Kirsch et al. | |
| 2005/0156026 A1* | 7/2005 | Ghosh et al. | 235/380 |
| 2005/0188194 A1 | 8/2005 | Fascenda | |
| 2005/0234860 A1 | 10/2005 | Roever et al. | |
| 2005/0250440 A1 | 11/2005 | Zhou et al. | |
| 2006/0135121 A1 | 6/2006 | Abedi et al. | |
| 2006/0163345 A1* | 7/2006 | Myers et al. | 235/380 |
| 2006/0165060 A1* | 7/2006 | Dua | 370/352 |
| 2006/0165078 A1 | 7/2006 | Gopnath et al. | |
| 2007/0011729 A1 | 1/2007 | White | |
| 2007/0057038 A1 | 3/2007 | Gannon | |
| 2007/0087756 A1 | 4/2007 | Hoffberg | |
| 2007/0100710 A1* | 5/2007 | Singh | 705/26 |
| 2007/0156517 A1* | 7/2007 | Kaplan et al. | 705/14 |
| 2007/0198432 A1 | 8/2007 | Pitroda et al. | |
| 2007/0226807 A1 | 9/2007 | Ginter et al. | |
| 2007/0241182 A1 | 10/2007 | Buer | |
| 2007/0250393 A1 | 10/2007 | Alberth, Jr. et al. | |
| 2008/0004894 A1* | 1/2008 | Son et al. | 705/1 |
| 2008/0010215 A1 | 1/2008 | Rackley, III et al. | |
| 2008/0025238 A1 | 1/2008 | McCown et al. | |
| 2008/0103981 A1* | 5/2008 | Park et al. | 705/64 |
| 2008/0182592 A1* | 7/2008 | Cha et al. | 455/456.3 |
| 2008/0208741 A1* | 8/2008 | Arthur et al. | 705/41 |
| 2008/0228651 A1* | 9/2008 | Tapsell | 705/65 |
| 2008/0280592 A1 | 11/2008 | McCown et al. | |
| 2008/0291013 A1 | 11/2008 | McCown et al. | |
| 2009/0141896 A1 | 6/2009 | McCown et al. | |
| 2009/0216680 A1 | 8/2009 | McCown et al. | |

OTHER PUBLICATIONS

Hashemi et. al., "A Secure m-Payment Protocol for Mobile Devices", IEEE, May 2006.*

"MeT Authorization for account based payment using a SET Wallet Server Version A", www.mobiletransaction.org, Feb. 21, 2001.*

Borselius, N., "Multi-agent system security for mobile communication", Technical Report, Royal Holloway University of London, Sep. 1, 2003.

"FBI taps cell phone mic as evesdropping tool", http://news.com.com/210-1029_6140191.html, Dec. 1, 2006, 4 pages.

"Multi-Tasking Cell Phone Signal Detection System", www.antennasystems.com/cellphonedetector.html, copyright 2004-2006; printed Apr. 6, 2006, 3 pages.

PCT, International Search Report and Written Opinion, PCT/IB08/03377 (International filing date Dec. 8, 2008), mailed Jul. 13, 2009.

PCT, International Search Report and Written Opinion, PCT/US08/62675 (International filing date May 5, 2008), mailed Dec. 5, 2008.

PCT, International Search Report and Written Opinion, PCT/US09/32273 (International filing date Jan. 28, 2009), mailed Mar. 13, 2009.

PCT, International Search Report and Written Opinion, PCT/US09/32279 (International filing date Jan. 28, 2009), mailed Mar. 16, 2009.

PCT, International Search Report and Written Opinion, PCT/US09/35205 (International filing date Feb. 26, 2009), mailed Nov. 6, 2009.

McCown et al, U.S. Appl. No. 12/196,669, Systems and Methods for Performing File Distribution and Purchase, filed Aug. 22, 2008.

McCown et al., U.S. Appl. No. 11/948,272, Processing Module Operating Methods, Processing Modules, and Communications Systems, filed Nov. 30, 2007.

Borselius, N., "Multi-agent system security for mobile communication," Technical Report, Sep. 1, 2003, Royal Holloway University of London <URL:https://eprints.kfupm.edu.sa/52066/1/52066.pdf>. pp. 1-215.

PCT International Search Report and Written Opinion of the International Searching Authority for PCT/IB08/03377, mailed Jul. 13, 2009, 9 pages.

Heydt-Benjamin, et al., "RFID Payment Card Vulnerabilities Technical Report," Oct. 11, 2006, pp. 1-6.

Heydt-Benjamin, et al, "Vulnerabilities in First-Generation RFID-enabled Credit Cards," Oct. 22, 2006, pp. 1-17.

Bellare, Mihir, et al., "Keying Hash Functions for Message Authentiction," Jun. 1996, pp. 1-19.

Bellare, Mihir, et al., "Message Authentication using Hash Functions—The HMAC Construction," RSA Laboratories' CryptoBytes, vol. 2, No. 1, Spring 1996, pp. 1-5.

Wong, Ford-Long, et al., "Repairing the Bluetooth pairing protocol," Security Protocols 2005, pp. 1-17.

"The Keyed-Hashed Message Authentication Code (HMAC)," FIPS PUB 198, Mar. 6, 2002.

"RFID Reference Model," CE RFID, Version 2007-2-1, Jan. 10, 2007.

* cited by examiner

SYSTEMS AND METHODS FOR PERFORMING WIRELESS FINANCIAL TRANSACTIONS

RELATED APPLICATIONS

The present patent application claims the benefit of U.S. Provisional Patent Application Ser. No. 61/031,605, filed Feb. 26, 2008 and entitled "Phone-to-Phone Financial Transaction System," and the benefit of U.S. Provisional Patent Application Ser. No. 61/031,885, filed Feb. 27, 2008 and entitled "Phone-to-Phone Secure File Distribution System With Payment," each of which application is assigned to the assignee hereof, and the disclosure of each of which application is incorporated herein in its entirety by reference.

This application is also related to U.S. patent application Ser. No. 12/196,669 filed on even date herewith and entitled "Systems and Method for Performing File Distribution and Purchase," assigned to the assignee hereof and the disclosure of which application is incorporated herein in its entirety by reference.

GOVERNMENT RIGHTS

The United States Government has certain rights in this invention pursuant to Contract No. DE-AC07-05-ID14517, between the United States Department of Energy and Battelle Energy Alliance, LLC.

TECHNICAL FIELD

Embodiments of the present invention relate generally to wireless communications systems and, more specifically, to systems and methods of performing financial transactions using wireless communication systems.

BACKGROUND

For many years, cellular telephones were designed primarily to provide wireless voice communications. With new advances in technology, however, additional functionality has been added to cellular telephones, which are sometimes referred to as personal wireless devices. For example, personal wireless devices including the functionality of a cellular phone, personal digital assistant, email client, media player, and a digital camera are now common. Due to the increased capabilities of these devices, many subscribers are using the devices to store or access sensitive information (e.g., financial account information) or to access private networks (e.g., corporate networks).

With respect to financial transactions, security and fraud prevention innovations are vital to market expansion and user acceptance of new forms of wireless transactions. For example, credit card transactions, whether conducted in person or over the Internet, are susceptible to fraud and theft by increasingly sophisticated thieves. Such attacks range from stealing credit card receipts or copying card numbers to attacking web accessible databases in order to acquire massive amounts of credit card account numbers. Fraud from these types of attacks results in billions of dollars in losses each year, both from these initial thefts of funds, as well as the resulting identity theft.

In addition to working toward fraud prevention, credit card companies are continuously seeking novel methods of expanding their customer sets. Many growth activities center on recruiting young people with a perceived need to establish credit, such as those entering the market for the first time, college students with grant money to spend, and people trying to repair bad credit.

There is a need for systems and methods to support secure wireless financial transactions between individuals wherein individuals may safely use their wireless devices in combination with their financial accounts to purchase items from each other, without the need for stationary credit card terminals.

BRIEF SUMMARY OF THE INVENTION

Embodiments of the present invention include systems and methods to perform secure wireless financial transactions between individuals wherein individuals may safely use their wireless devices in combination with their financial accounts to purchase items from each other, without the need for stationary credit card terminals.

In one embodiment of the present invention, a secure computing module is configured for operable coupling to a host device. The secure computing module includes a processor for performing secure processing operations, a host interface for operably coupling the processor to the host device, and a memory operably coupled to the processor wherein the processor logically isolates at least some of the memory from access by the host device. The secure computing module also includes a proximate-field wireless communicator operably coupled to the processor and configured for communication with another secure computing module associated with another host device when within a proximate-field range of the other secure computing module. The secure computing module is configured to generate a secure digital signature for a financial transaction package and communicate the financial transaction package and the secure digital signature to the other secure computing module using the proximate-field wireless communicator.

In accordance with another embodiment of the present invention, a method of performing a financial transaction includes determining financial transaction details for the financial transaction, signing the financial transaction details with a buyer's secure digital signature, and signing the financial transaction details with a seller's secure digital signature. The financial transaction details, the buyer's secure digital signature, and the seller's secure digital signature comprise a financial transaction package. The financial transaction package is communicated between a buyer's wireless communication device and a seller's wireless communication device via a proximate-field wireless communication channel. The method also includes communicating the financial transaction package to a seller's financial organization via a cellular communication channel and communicating the financial transaction package from the seller's financial organization to a buyer's financial organization. The seller's financial organization verifies the seller's secure digital signature and the financial transaction details and sends a seller approval to the buyer's financial organization. The buyer's financial organization verifies the buyer's secure digital signature and the financial transaction details, sends a buyer approval to the seller's financial organization, and performs a fund transfer from the buyer's financial organization to the seller's financial organization.

In accordance with still another embodiment of the present invention, a method of performing a financial transaction includes determining financial transaction details for the financial transaction, signing the financial transaction details with a buyer's secure digital signature, and signing the financial transaction details with a seller's secure digital signature.

The financial transaction details, the buyer's secure digital signature, and the seller's secure digital signature comprise a financial transaction package. The financial transaction package is communicated between a buyer's wireless communication device and a seller's wireless communication device via a proximate-field wireless communication channel. The method also includes communicating the financial transaction package to a buyer's financial organization via a cellular communication channel and communicating the financial transaction package from the buyer's financial organization to a seller's financial organization. The seller's financial organization verifies the seller's secure digital signature and the financial transaction details and sends a seller approval to the buyer's financial organization. The buyer's financial organization verifies the buyer's secure digital signature and the financial transaction details, sends a buyer approval to the seller's financial organization, and performs a fund transfer from the buyer's financial organization to the seller's financial organization.

In accordance with still another embodiment of the present invention, a method of performing a financial transaction includes determining financial transaction details for the financial transaction, signing the financial transaction details with a buyer's secure digital signature, and signing the financial transaction details with a seller's secure digital signature. The financial transaction details, the buyer's secure digital signature, and the seller's secure digital signature comprise a financial transaction package. The financial transaction package is communicated between a buyer's cellular communication device and a seller's Internet site. The method also includes communicating the financial transaction package to a buyer's financial organization and a seller's financial organization. The seller's financial organization verifies the seller's secure digital signature and the financial transaction details and sends a seller approval to the buyer's financial organization. The buyer's financial organization verifies the buyer's secure digital signature and the financial transaction details, sends a buyer approval to the seller's financial organization, and performs a fund transfer from the buyer's financial organization to the seller's financial organization.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention. It should be understood, however, that the detailed description and the specific examples, while indicating examples of embodiments of the invention, are given by way of illustration only and not by way of limitation. From this disclosure, various substitutions, modifications, additions, rearrangements, or combinations thereof within the scope of the present invention may be made and will become apparent to those skilled in the art.

Embodiments of the present invention include systems and methods to perform secure wireless financial transactions between individuals wherein individuals may safely use their wireless devices in combination with their financial accounts to purchase items from each other, without the need for stationary credit card terminals.

The systems and methods include a phone-to-phone financial transaction system that enables secure person-to-person financial transactions by augmenting Personal Electronic Devices (PEDs) with software and a Secure Computing Module (SCM) for executing the software. The SCM may be processing hardware that is either embeddable or embedded in the PED.

As used herein, a PED may be any mobile computing device used by a user and capable of communication using a cellular wireless communication channel. A PED may also be referred to herein as a host device, a cellular communication device, or a wireless communication device. Examples of PEDs include cell phones, smartphones, Blackberry® smart phones, pagers, Personal Digital Assistants, music players (e.g., MP3 players and IPods) handheld computing platforms, wrist-worn computing systems, or other mobile computing systems (e.g., laptops). In addition, the host device may be a desktop computer or other device such as, for example, satellite TV receivers, Digital Versatile Disc (DVD) players, and Video Cassette Recorders (VCRs) equipped with a secure computing module.

Figure 1:
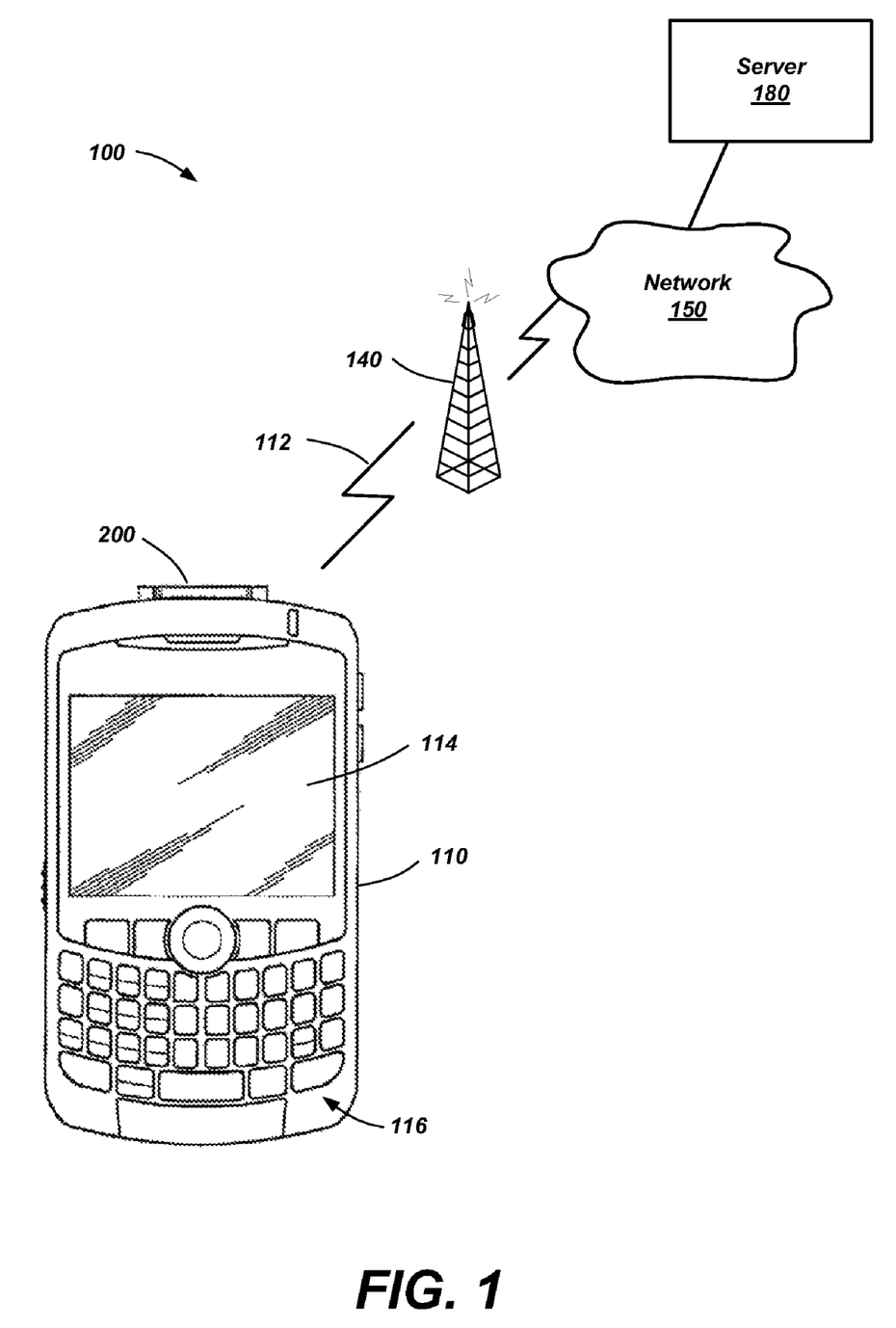
FIG. 1 illustrates a communication system including a host device and a secure computing module.

FIG. 1 illustrates a communication system 100 including a host device 110, a server 180, a network 150, a wireless communications base station 140, and a secure computing module 200.

In some embodiments, the host device 110 may be a cellular communication device 110. The cellular communication device 110 may communicate with the base station 140 using a wireless channel 112, which may be a cellular wireless channel. The cellular communication device 110 may be a wireless communication device, such as a smart phone, Blackberry® smart phone, laptop computer, or other suitable device configured to communicate with a terrestrial cellular base station 140. The base station 140 may communicate with the network 150. The network 150 may be a communications network such as the Internet, the public switched telephone network, or any other suitable arrangement for implementing communications.

The cellular communication device 110 may include a display for communicating information to a user and a keypad for the user to communicate information to the cellular communication device 110.

The secure computing module 200 may be physically connected to the cellular communication device 110. As a non-limiting example, the secure computing module 200 may be configured as a card suitable for insertion into the host device 110. Although physically connected to the host device 110, the secure computing module 200 may execute software independently and/or isolated from the host device 110.

Figure 2:
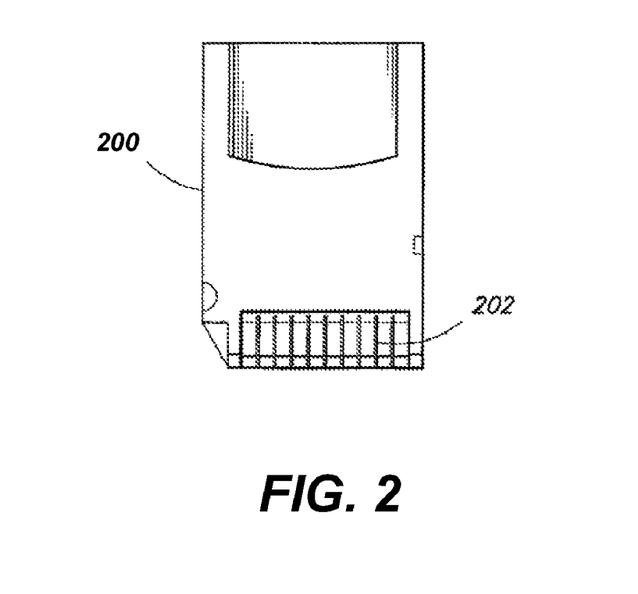
FIG. 2 illustrates a front view of the secure computing module embodied in a card suitable for insertion into a cellular communication device.
Figure 2A:
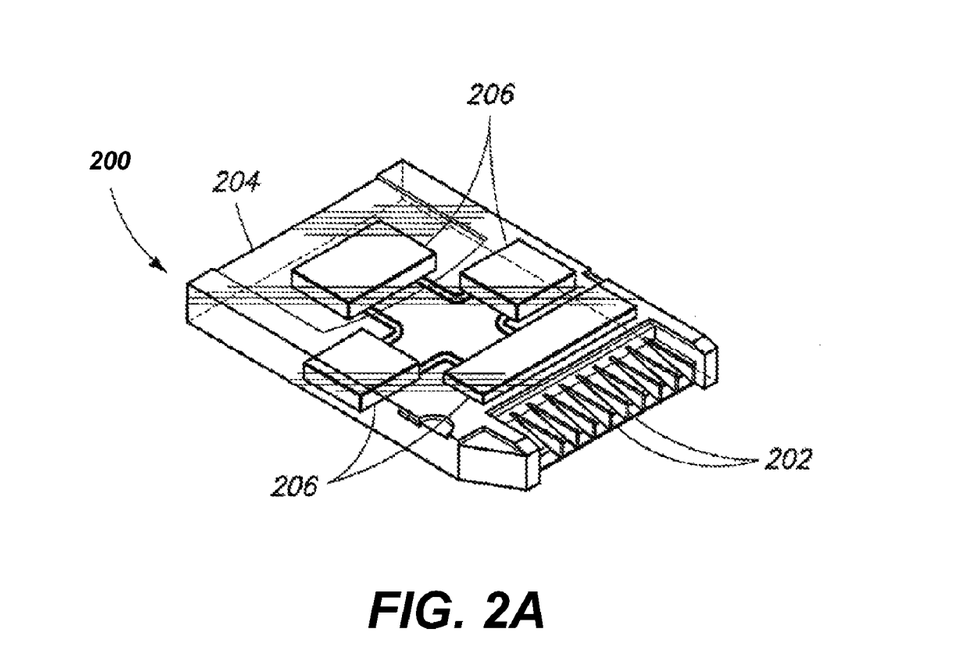
FIG. 2A illustrates an isometric view of the secure computing module of FIG. 2 with a semi-transparent view to illustrate internal components according to an embodiment of the invention.

FIG. 2 illustrates a front view of the secure computing module 200 embodied in a card suitable for insertion into the cellular communication device 110. FIG. 2A illustrates an isometric view of the secure computing module 200 of FIG. 2 with a semi-transparent view to illustrate internal components according to an embodiment of the invention. The secure computing module 200 may have physical characteristics similar to a Secure Digital (SD) memory card. For example, the secure computing module 200 may include a housing 204 having dimensions substantially similar to an SD memory card. Furthermore, the secure computing module 200 may include a host interface 202 configured to be physically and electrically connected to the cellular communication device 110. As non-limiting examples, the host interface 202 may be configured as an SD Input/Output (SDIO) interface, a Secure Digital High Capacity (SDHC) interface, or other interface suitable for plugging into an expansion slot of the cellular communication device 110. As illustrated in FIG. 2A, the secure computing module 200 may include the housing 204, circuitry 206, and the host interface 202.

The housing 204 encompasses the circuitry 206 and may allow a user to handle the secure computing module 200 without damaging the circuitry 206 by surrounding the circuitry 206, so that circuitry 206 is not physically exposed to the user.

As shown in FIGS. 2 and 2A, some embodiments may be configured such that the housing 204 including the secure computing module 200 is different from and removable from the host device 110. In other embodiments, the secure computing module 200 may not include a housing and may be embedded in with the cellular communication device 110. In any embodiment, the secure computing module 200 is configured to maintain at least a logical isolation from the cellular communication device 110, as is explained more fully below.

The circuitry 206 may comprise one or more integrated circuits and may comprise one or more circuit boards. The circuitry 206 may be configured to perform the functionality of the secure computing module 200.

Of course, the secure computing module 200 may be configured with a form factor other than an SD form factor. For example, the secure computing module 200 may have the physical characteristics (e.g., dimensions) of a TransFlash, miniSD, microSD, memory stick, compact flash, Multi Media Card (MMC), reduced size MMC, MMC micro, smart media, smart card, mini smart card, xD memory card, or other suitable form factor compatible with the cellular communication device 110.

As another non-limiting example, the host interface 202 may be a serial bus, such as, for example, a Universal Serial Bus (USB) interface or "firewire" interface suitable for compatible connections to the cellular communication device 110. Other physical configurations and host interface formats that enable the secure computing module 200 to be operably coupled to the host device 110 are also possible.

Although the physical characteristics (e.g., dimensions) of the secure computing module 200 and the host interface 202 may be similar to one of the above-mentioned memory card formats, the secure computing module 200 may perform functionality beyond that performed by a memory card as is discussed more fully below.

Figure 3:
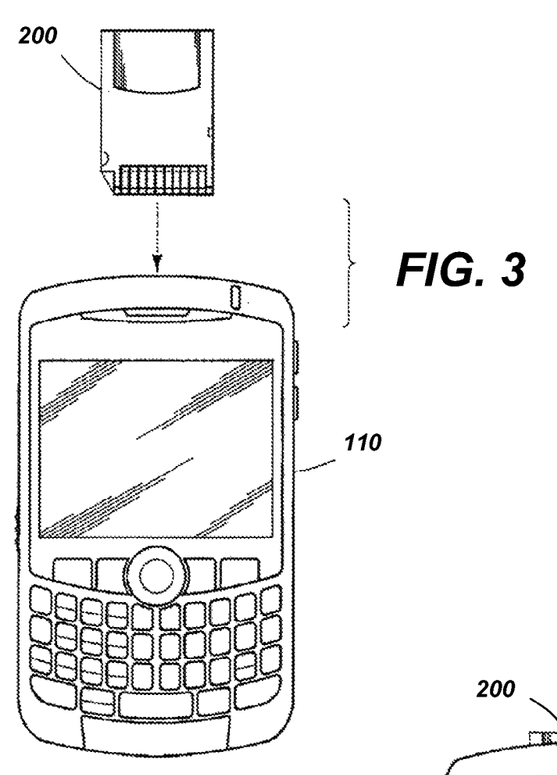
FIG. 3 illustrates the secure computing module disconnected from the cellular communication device.

FIG. 3 illustrates the secure computing module 200 disconnected from the cellular communication device 110. In other words, a user of the secure computing module 200 may connect the secure computing module 200 to the cellular communication device 110 and may later disconnect the secure computing module 200 from the cellular communication device 110. In general, with removable card formats, the user may disconnect the secure computing module 200 from the cellular communication device 110 by hand without tools and without damaging the secure computing module 200.

A user may connect the secure computing module 200 to the cellular communication device 110 by inserting the secure computing module 200 into a receptacle of the cellular communication device 110 thereby physically and electrically connecting the secure computing module 200 to the cellular communication device 110. In some embodiments, the secure computing module 200 may be inserted into a slot formed within the housing of the cellular communication device 110.

With removable card formats, the secure computing module 200 may be used in more than one the cellular communication device 110 at different moments in time. For example, a user of the secure computing module 200 may use the secure computing module 200 in the cellular communication device 110 and may then later use the secure computing module 200 in a different the cellular communication device 110.

Figure 3A:
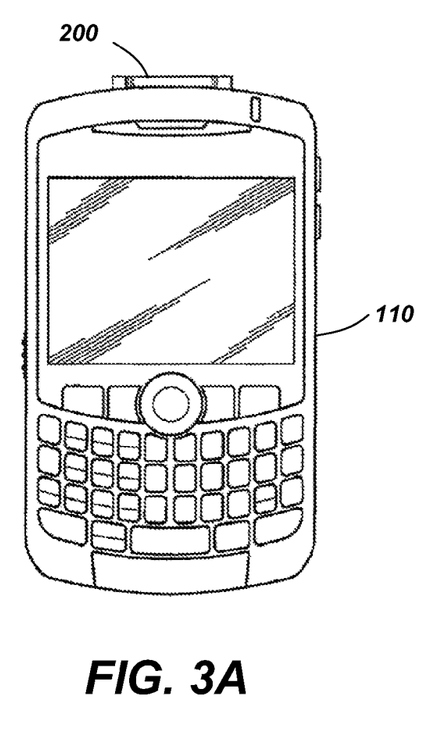
FIG. 3A illustrates the secure computing module physically and electrically connected to the cellular communication device.

FIG. 3A illustrates the secure computing module 200 physically and electrically connected to the cellular communication device 110. In some embodiments, the secure computing module 200 may operate by using power supplied by the cellular communication device 110 and may receive power from the cellular communication device 110 via the host interface 202 (FIG. 2A). Thus, the secure computing module 200 might not be configured to operate when disconnected from the cellular communication device 110 other than to store data in non-volatile memory. In other embodiments, the secure computing module 200 may include its own internal power source.

In some embodiments, the secure computing module 200 may communicate directly with the base station 140, network 150, or server 180. In other embodiments, the secure computing module 200 may communicate with the base station 140, network 150, and server 180 through the host interface 202 and the cellular communication device 110. Accordingly, the cellular communication device 110 may receive information from the secure computing module 200 and forward the information to the network 150. Conversely, the cellular communication device 110 may receive information from the network 150 and forward that information on to the secure computing module 200.

Figure 4:
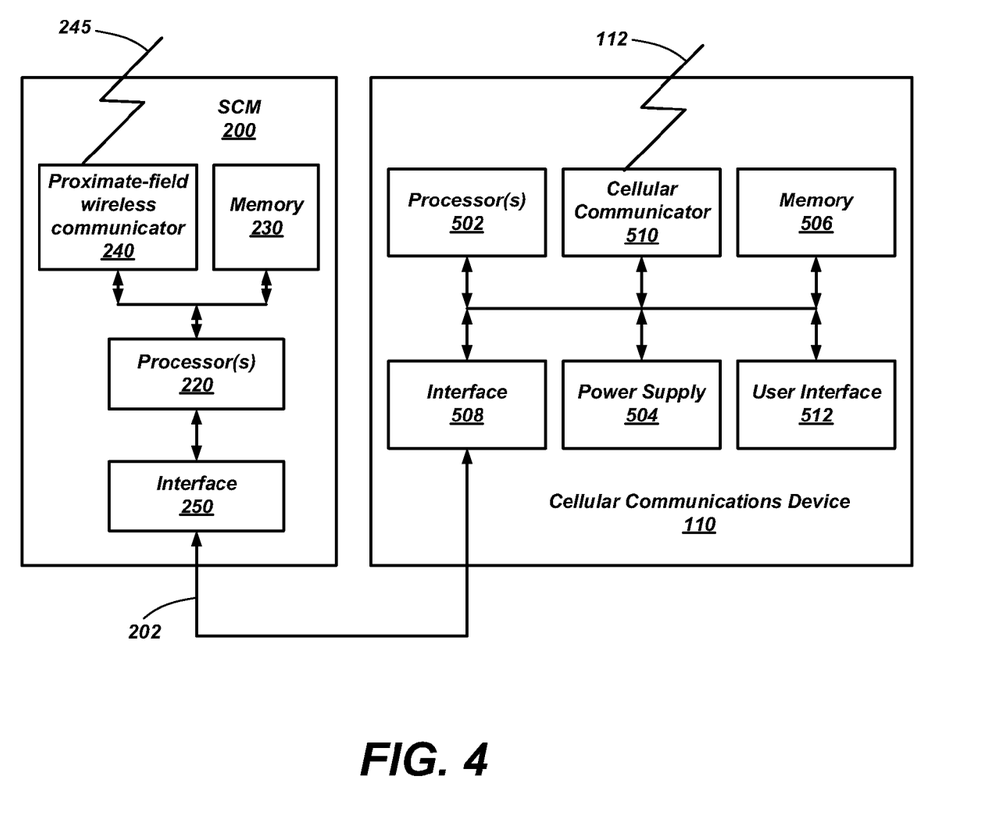
FIG. 4 illustrates a simplified block diagram of the secure computing module in communication with the cellular communication device.

FIG. 4 illustrates a simplified block diagram of the secure computing module 200 in communication with the cellular communication device 110. The cellular communication device 110 may include an interface block 508 for communicating with the host interface 202, one or more processors 502, a power supply 504, memory 506, a cellular communicator 510, and a user interface 512.

The secure computing module 200 may include one or more processors 220, memory 230, a proximate-field wireless communicator 240, and an interface block 250 for communicating on the host interface 202.

The processor 220 may be implemented as one or more of a general purpose microprocessor, a special purpose microprocessor, a microcontroller, other suitable hardware, such as, for example, an Application Specific Integrated Circuit (ASIC) or Field Programmable Gate Array (FPGA), or combinations thereof. These examples for the processor 220 are for illustration only and other configurations are possible. The interface block 250 is configured to communicate on the host interface 202, as described earlier.

The secure computing module 200 is configured for executing software programs containing computing instructions. The one or more processors 220 may be configured for executing a wide variety of operating systems and applications including the computing instructions for carrying out embodiments of the present invention.

The memory 230 may be used to hold computing instructions, data, and other information for performing a wide variety of tasks including performing embodiments of the present invention. The memory 230 may be embodied in a number of different forms using electronic, magnetic, optical, electromagnetic, or other techniques for storing information. By way of example and not limitation, the memory 230 may include Synchronous Random Access Memory (SRAM), Dynamic RAM (DRAM), Read-Only Memory (ROM), Flash memory, and the like.

The proximate-field wireless communicator 240 is configured for wireless communication across the proximate-field wireless communication channel 245 to another suitably equipped proximate-field wireless communicator. In some embodiments, the other suitably equipped proximate-field wireless communicator may be configured as part of another secure computing module 200, another secure computing module 200 configured in another cellular communication device 110, or a point-of-sale terminal configured for wireless communication.

The secure computing module 200 may use functionality provided by the cellular communication device 110. For example, the cellular communication device 110 may include a user interface 512 comprising a display 114 (FIG. 1) and a keypad 116 (FIG. 1). Since the secure computing module 200 might not have a user interface, the secure computing module 200 may provide user interaction data and instruct the cellular communication device 110 to display the information on the display 114. Similarly, the secure computing module 200 may request that the cellular communication device 110 provide the secure computing module 200 with user interaction data entered by a user on the keypad 116.

In some embodiments, the power supply 504 may provide power to the secure computing module 200. In other embodiments, the secure computing module 200 may include its own power supply (not shown).

The proximate-field wireless communication channel 245 may be any wireless frequency and protocol configured for somewhat localized communication. Some non-limiting examples of suitable protocols and frequencies are: suitable Radio Frequencies, 802.1 a/b/g/n type wireless connections, infrared, Bluetooth, Radio Frequency Identification (RFID), WiFi, WiMax, or other suitable communication definitions. As non-limiting examples, distances of less than an inch to a few inches for RFID communication up to about 100 feet for Bluetooth communication are considered suitable proximate-field ranges.

Figure 5:
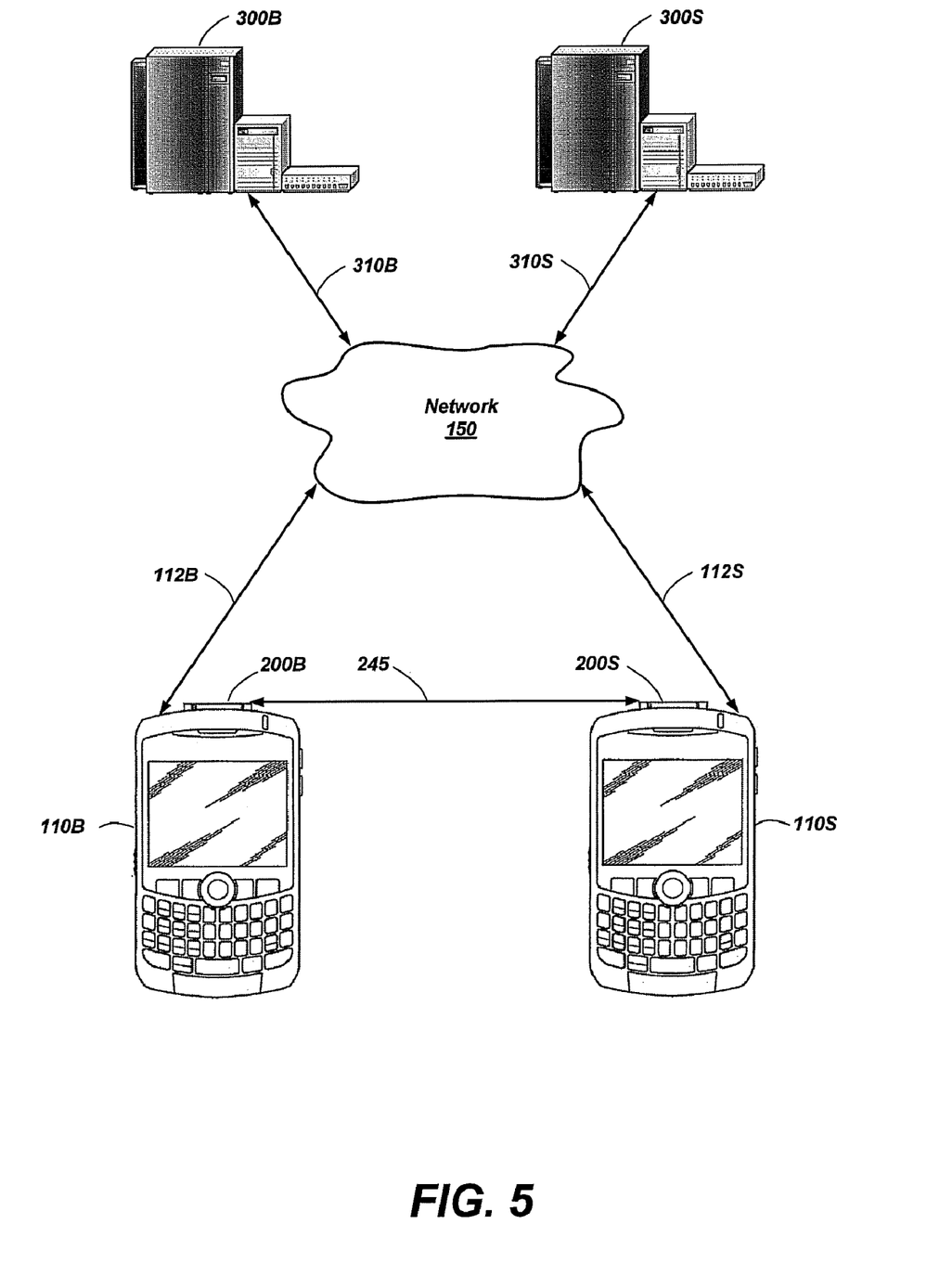
FIG. 5 illustrates a simplified system diagram of a communication system for performing financial transactions between individuals.

FIG. 5 illustrates a simplified system diagram of a communication system for performing financial transactions between individuals. The communication system may include two or more cellular communication devices equipped with a secure computing module (e.g., a buyer's cellular communication device 110B with a buyer's secure computing module 200B and a seller's cellular communication device 110S with a seller's secure computing module 200S). The buyer's secure computing module 200B and the seller's secure computing module 200S may communicate with each other over the proximate-field wireless communication channel 245. The buyer's cellular communication device 110B may communicate with other cellular communication devices, the Internet, or other public and private networks over cellular communication channel 112B and the network 150. Similarly, the seller's cellular communication device 110S may communicate with other cellular communication devices, the Internet, or other public and private networks over cellular communication channel 112S and the network 150.

A seller's financial organization 300S may be operably coupled to the network over communication channel 310S. Similarly, a buyer's financial organization 300B may be operably coupled to the network over communication channel 310B. As non-limiting examples, the communication channels 310B and 310S may be through the Internet, cellular communication, or other suitable connection. In some embodiments, the seller's financial organization 300S and the buyer's financial organization 300B may be the same entity. Furthermore, in performing financial transactions, the seller's financial organization 300S and the buyer's financial organization 300B may be considered substantially similar to the server 180 of FIG. 1. In addition, financial organizations may be referred to generically herein with the designator 300.

In addition, FIG. 5 does not illustrate, but it would be understood by a person of ordinary skill in the art that the buyer's cellular communication device 110B and the seller's cellular communication device 110S generally communicate with the network 150 via a base station 140 as illustrated in FIG. 1.

Software processes illustrated herein are intended to illustrate representative processes that may be performed by one or more computing systems in carrying out embodiments of the present invention. Unless specified otherwise, the order in which the processes are described is not to be construed as a limitation. Furthermore, the processes may be implemented in any suitable hardware, software, firmware, or combinations thereof. By way of example, software processes may be stored in the memory 230 for execution, and executed by the one or more processors 220.

When executed as firmware or software, the instructions for performing the processes may be stored or transferred on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

In addition, the firmware or software may be communicated via a network. As non-limiting examples, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable software may be communicated as a data signal embodied in a carrier wave in but one example.

In addition, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

In operation for performing financial transactions and referring to FIGS. 4 and 5, the cellular communication device 110 is used to interface with a user to solicit input and display pertinent information under direction from the secure computing module 200. Software executing on the secure computing module 200 manages the financial transaction process. This software may be in the form of a standalone application, device embedded software, or may operate within a web browser native to the device, all of which can connect to the secure computing module 200. Additionally, the software may include an Application Program Interface (API), a Software Development Kit (SDK) or other suitable software interfaces and tools for generating and managing the software of the secure computing module 200.

The secure computing module 200 provides secure information storage for variables required for the financial transaction processes, such as public and private keys for signing and encryption, secret hashing keys, counter variable(s), etc. The secure computing module 200 also provides secure memory 230 and a secure processing environment for stored procedures such as hashing algorithms, encryption algorithms, counter incrementing, and other suitable secure processes.

Thus, the secure computing module 200 and secure memory 230 provide a logically isolated environment for computing hashes and encrypting information that is from external sources such as the cellular communication device 110 and other secure computing modules 200.

Executing the software in isolation on the secure computing module 200 rather than on the cellular communication device 110 may protect data generated by the software against unauthorized access, for example, by malicious software installed on the cellular communication device 110, by a user of the cellular communication device 110, or by a device having connectivity to the cellular communication device 110 through the network 150 and the base station 140.

In addition, the secure computing module 200 may be used to validate all input from external sources. As a non-limiting example, the secure computing module 200 may verify a signed transaction using the public signing key of the other party to the financial transaction.

When using encryption or hashing algorithms, the particular encryption scheme or encryption key may be known by the secure computing module 200 but not by the cellular communication device 110. As a result, the secure computing module 200 may disregard information received from the cellular communication device 110 that is not encrypted according to the particular encryption scheme or with the particular encryption key. Disregarding information not encrypted appropriately may prevent the cellular communication device 110 from interacting with the secure computing module 200 other than to relay user interface information between a user interface of the cellular communication device 110, the network 150, or the server 180.

The processor 220 may logically isolate some or all of the memory 230 from access by the processor 502 in the cellular communication device 110. In other words, the host interface 202 might not be able to communicate with the memory 230 except via permission and control of the processor 220, thereby preventing direct communication between the host interface 202 (or a device connected to the host interface 202 such as the cellular communication device 110) and the memory 230. In addition, the memory 230 may be physically isolated from prying access.

The secure computing module 200 may be pre-installed with protected information, such as, for example, financial transaction software and protected data (e.g., keys) from the vendor, manufacturer, or a combination thereof. In addition, the protected information may be updated on an already deployed system.

In deploying protected information, the protected information may be communicated to the secure computing module 200 using an encrypted information transfer process, wherein the information may include data, software, or a combination thereof. Upon valid decryption and verification of authenticity (i.e., that the software and data originated at the financial organization), the data and algorithms (i.e., software procedures) may be updated within the secure computing module 200.

The secure computing module 200 may request that the cellular communication device 110 retrieve the software from the server 180 (e.g., a web server, Supervisory Control and Data Acquisition (SCADA) server, corporate network server, financial organization 300B or 300S, or other server). As a non-limiting example of a buyer update, the buyer's cellular communication device 110B may retrieve the software from the buyer's financial organization 310B via cellular communication channel 112B then provide the software to the buyer's secure computing module 200B. The secure computing module 200B may decrypt the software if necessary, then install and execute the software. When encrypted, the cellular communication device 110 is unable to decrypt the encrypted software. Accordingly, upon retrieving encrypted software, the cellular communication device 110 simply forwards the encrypted software to the secure computing module 200 without decrypting the software.

The secure computing module 200 may additionally or alternatively request that the cellular communication device 110 send software or other information to the server 180 (FIG. 1). For example, the secure computing module 200 may encrypt financial information (e.g., an account number, a personal identification number, etc.), provide the encrypted information to the cellular communication device 110, and instruct the cellular communication device 110 to send the encrypted information to the server 180. Since the information, in this example, is encrypted, the cellular communication device 110 may be unable to decrypt the financial information.

Driver software may be installed on the cellular communication device 110 to assist the cellular communication device 110 in communicating with the secure computing module 200 and performing portions of financial transactions. As a non-limiting example, the driver software may enable communication on the host interface 202 according to an established smart card interaction standard (e.g., PC/SC). As another non-limiting example, the driver software may perform information presentation on the display 114 (FIG. 1) and information retrieval from the keypad 116 (FIG. 1) and communicate the user interaction information to or from the secure computing module 200.

The secure computing module 200 includes cryptographic algorithms for creating and decoding secure digital signatures. In addition, the secure computing module 200 may include cryptographic algorithms for encrypting and decrypting information. Thus, the secure portions of the memory 230 may include information such as the cryptographic algorithms, encryption keys, decryption keys, signing keys, counters, and other suitable cryptographic information.

Embodiments of the present invention include a process for creating a secure digital signature for a financial purchase package. The secure digital signature may be prepared by creating a cryptographically secure hash of financial transaction details in combination with a secret key. Any cryptographically secure hashing function in combination with a secret key may be used to fulfill the secure signing function. Furthermore, hashing algorithms and secret keys may be periodically updated by a financial organization associated with the user of the secure computing module 200.

The secret key is known only to the user's secure computing module 200 and the user's financial organization 300. However, the secure computing module 200 may be configured to handle multiple financial accounts. Thus, the secure computing module 200 may have a secret key for each account and the secret key for each account would be known by the financial organization servicing that account.

The financial transaction details may include a variety of information, such as, for example:
- description of the item(s) being sold;
- price of the item(s) (i.e., transaction amount);
- the time of transaction;
- the date of transaction;
- the location of the transaction (e.g., via GPS coordinates—if available);
- the buyer's credential and financial organization routing numbers; and
- the seller's credential and financial organization routing numbers.

The credentials of the buyer or the seller may include information such as, for example, account information such as account number and financial organization identification, a public key, and other suitable information. The credentials are used to uniquely identify an individual to the financial organization. Anonymity may be maintained through this process allowing a buyer or seller to withhold their identity from the other party. However, each party must be uniquely identified to the financial organizations in order for funds to transfer. If anonymity is not desired, the credentials may also include the user's name.

Embodiments of the present invention include a Financial Purchase Package (FPP) which, when completed, includes the financial transaction details, a buyer's secure digital signature, and a seller's secure digital signature.

The secure digital signature for both the buyer and the seller may be created with a secure hashing function using a secret key. Secure hashing functions come in many forms and are occasionally standardized by government bodies such as the National Institute of Standards and Technology (NIST). As new cryptographically secure hashing functions using secret keys are standardized, they may be incorporated into the secure computing module 200.

A non-limiting example of a secure hash using a secret key is described in Federal Information Processing Standard (FIPS) Publication 198, which is incorporated by reference herein. In general terms, the hashing function may be represented by the following equation:

$$HMAC_K(m) = h((K \oplus opad) \| h((K \oplus ipad) \| m))$$

In this equation, h is a cryptographic hash function, K is a secret key padded with extra zeros to the block size of the hash function, m is the message to be authenticated, the symbol shown as a '+' with a circle around it denotes an exclusive or (XOR) operation while the ∥ denotes concatenation, and the outer padding opad=0x5c5c5c . . . 5c5c and inner padding ipad=0x363636 . . . 3636 are two one-block-long hexadecimal constants.

Thus, the secret key is the digital signature secret key known only to the secure computing module 200 and the user's financial organization 300. The message to be authenticated is the financial transaction details along with a Transaction Number Identifier (TNI).

As an addition to the secure hash, a second secret encryption key may be optionally included and added to the list of items above for the financial transaction details, and, as a result, be included in the computation of the hashing function. This additional secret value will also be stored with the other keying material on the financial organization's secure computing module 200. While keyed hashes are considered secure, cryptanalysts and hackers continue to make progress in breaking hashes and other encryption processes. To keep embodiments of the present invention more secure, this second secret key may be included in the hash function to increase the entropy of the computed secure hash in a manner that is easy for the secure computing modules 200 to process.

The TNI is a unique number associated with the current transaction and the secure computing module 200. The unique number may be created in a number of ways. As a non-limiting example, the TNI may simply be a running incremented count of the transactions performed by the secure computing module 200. As another non-limiting example, the TNI may be generated by a complex algorithm, such as a pseudo-randomly generated number, as long as the secure computing module 200 and the user's financial organization 300 can generate the same number for the current transaction.

Thus, the TNI refers to a counted or computed transaction number for a given party (e.g., buyer or seller) to a specific transaction and is created when the transaction is signed. The buyer and seller may have different transaction numbers as they will have performed a differing number of transactions or use a different TNI generation algorithm. In other embodiments, the TNI may be the same for both the buyer and the seller. In this case, the TMI will be computed by the party that initiates the transaction (either buyer or seller) and will be used in the digital signature process of the other party.

The TNI is included in the financial purchase package signing computation as part of the financial transaction details. It is also sent along with the signed FPP to the financial organization to help index the purchase transactions. Thus, there maybe a different TNI used by the buyer when the buyer signs the FPP than the TNI used by the seller when the seller signs the FPP.

It should be noted that the financial transaction details, along with the buyer's secure digital signature and the seller's secure digital signature may be transferred between the buyer's secure computing module 200B and the seller's secure computing module 200S over the proximate-field wireless communication channel 245. The proximate-field communication wireless channel 245 may have a default frequency and protocol. As a non-limiting example, the proximate-field communication channel 245 may be RFID. However, another channel may be used if the default channel is not available, or the user selects a different channel for use. As a non-limiting example, other possible communication channels are Short Message Service (SMS), Multimedia Message Service (MMS), Wireless Application Protocol (WAP), Bluetooth, WiFi, and other suitable protocols.

In some cases, the proximate-field communication channel 245 may not be particularly secure from snooping by others. However, embodiments of the present invention ensure that the current transaction is not compromised by using the secure digital signature of both the buyer and the seller. On the other hand, the financial transaction details may be discoverable if not encrypted, which may lead to identity theft if enough information is present in the financial transaction details. Consequently, some embodiments may include encryption and decryption of the financial purchase package.

The encryption and decryption may use any suitable cryptographic algorithms. As a non-limiting example, the cryptographic algorithm may be a symmetric algorithm such as Advanced Encryption Standard (AES), which is well known in the art. Symmetric cryptography requires a secret key known only to the encryptor and the decryptor. Thus, the encryption may take place such that the secret key is known to a user and the user's financial organization. In this case, the secret key may be the same key used for creating the secure digital signature using the hashing algorithm, or it may be a different secret key used for the encryption/decryption. Alternatively, the secret key may be a secret key between the buyer and the seller determined during a discovery process, as is explained below.

As another non-limiting example, the cryptographic algorithm may be an asymmetric algorithm such as RSA, which is well known in the art. The RSA denotes initials of the individuals that first disclosed the encryption algorithm. In asymmetric cryptography, two keys are used, a public key and a private key. A user may let his public key be known to anyone and keeps his private key just to himself. Anyone wishing to send an encrypted message to the user encrypts the message using the user's public key. Once encrypted, the message can only be decrypted by the private key, which only the user knows.

Thus, there may be a number of keys stored and managed by the secure computing module 200, such as, for example, secret digital signature keys, secret encryption keys, private keys, and public keys. Generally, users do not directly update their encryption and signing keys. In other words, users have access to use their keys but do not have access to manipulate their keys. Key updates, additions, or changes may be done by an organization controlling the servers that create the secure computing module 200.

To manage and update keys securely, a Personal Identification Code (PIC) routine may be included in the secure computing module 200 to allow the user to authenticate himself to the secure computing module 200. The PIC may include a series of alphanumeric values known only to the user and the secure computing module 200. In another embodiment, the PIC may be the digital representation of some biometric feature such as a fingerprint or retinal scan. In another embodiment, the user may initiate a PIC input request wherein the secure computing module 200 outputs a series of alphanumeric characters that the user must in turn re-enter or re-type and submit back to the secure computing module 200. Of course, the PIC routine may include combinations of entering biometric information and alphanumeric values. Furthermore, the PIC routine may include a random Completely Automated Public Turing test to tell Computers and Humans Apart (CAPTCHA) algorithm for user entry. CAPTCHAs are the slanted and distorted fuzzy characters displayed that a human can discern, but which a computer may not be able to discern.

In other embodiments, the secure computing module 200 may receive the PIC inputs directly from an attached or attachable input device (not shown). One example of this is an external fingerprint or retinal scan reader device that is connected via a wire(s) directly into the secure computing module 200. This extra hardware provides more secure input that does not require the inputs to pass through the memory 506 or processor 502 of the cellular communication device 110 or other computing device containing the secure computing module 200.

The secret keys for encryption/decryption, as well as for secure hashing to create digital signatures, may be refreshed periodically by the financial organization when the secure computing module 200 connects to the financial organization for transaction processing. If thus configured, the financial organization 300 may optionally initiate a connection to the host device 110 including the secure computing module 200 for the purpose of re-keying.

As a non-limiting example of used keys, two public and private key pairs may be created for each secure computing module 200. For the first key pair, the public key is stored in the user's secure computing module 200 and the private key is stored with the financial organization's secure computing module 200. This first key pair allows the user's secure computing module 200 to encrypt information to be sent to the financial organization. For the second key pair, the private key is stored in the user's secure computing module 200 and the public key is stored with the financial organization's secure computing module 200. This second key pair allows the financial organization's secure computing module 200 to encrypt information to be sent to the user's secure computing module 200. This two key pair system may be used so that each user's secure computing module 200 may have its own unique encrypted communication channel by which to communicate with the financial organization. Having separate keys for this purpose protects against a situation where if one encryption channel is hacked, then all encryption channels would be hacked. In addition, since public key encryption is much slower than symmetric key encryption, these two key pairs may be used to exchange a temporary symmetric key, which may be used for a specific transaction.

To perform a financial transaction between two individuals with secure computing modules 200 a discovery process first takes place such that the two secure computing modules 200 are aware of each other. For the discovery process to take place, the two secure computing modules 200 must be within the proximate-field range of the proximate-field wireless communicators 240.

The discovery process begins with an overt user selection from a host device 110 with a secure computing module 200 to initiate a transaction and connect to another host device 110. This process is generally not simply "automatic" as in the case of most RFID payment cards and devices as the RFID process may be inherently insecure and prone to theft, eavesdropping, and abuse. However, in some embodiments, backward compatibility with conventional RFID systems, may be enabled to authorize automatic responses. As a non-limiting example, the use may which to enable automatic responses for items such as low-dollar transactions such as subway fare transaction.

The discovery process may use any of several methods well known in the industry whereby an inquiry process looks for compatible devices. When such a device is found, both parties may input or negotiate the same secret session key value, etc. Session encryption may then be based on that shared secret key value. Non-limiting examples of this discovery and key negotiation process are Bluetooth pairing and enhancements to the Bluetooth pairing process, which are well known in the art.

The discovery process is conducted over the proximate-field wireless communicators 240 contained within the secure computing modules 200. Having a secure processor control what, when, and how information is sent and received may enhance the security of the system.

Optionally, the discovery process may be conducted using conventional online client-server methods, or store and forward formats such as a secure Short Message Service (SMS) protocol.

Figure 6:
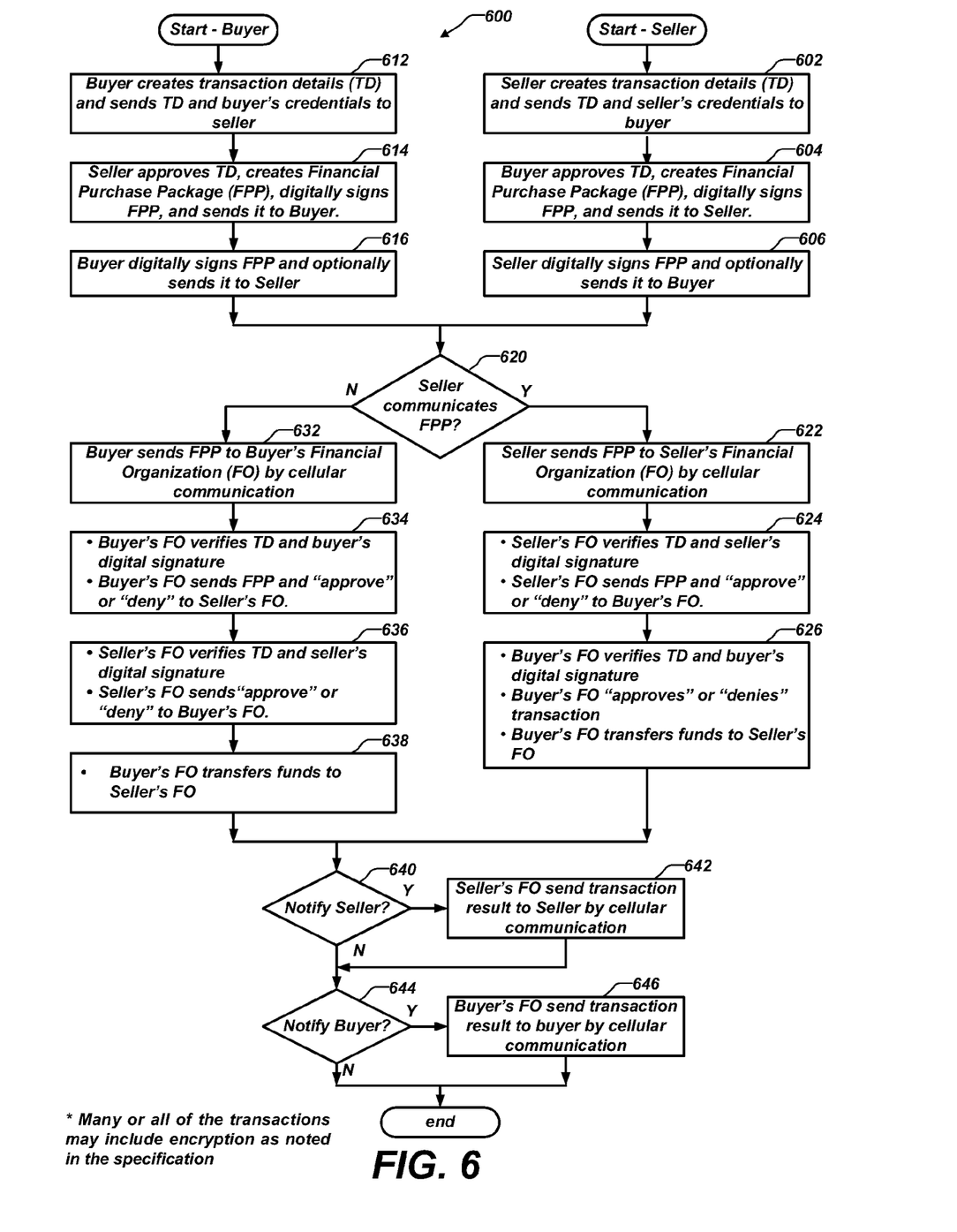
FIG. 6 is a simplified flow diagram illustrating acts that may be performed during a financial transaction between individuals.

FIG. 6 is a simplified flow diagram illustrating acts that may be performed during a financial transaction between individuals after the discovery process has been completed. It should be noted that any of the communications between any of the buyer's wireless communication device 110B, the buyer's secure computing module 200B, the buyer's financial organization 300B, the seller's wireless communication device 10S, the seller's secure computing module 200S, and the seller's financial organization 300S, may or may not be encrypted as is explained above.

The financial transaction 600 may begin with either the buyer or the seller, and can be followed with reference to FIG. 6, and occasional reference to FIGS. 4 and 5. If the buyer starts the financial transaction 600, operation block 612 indicates that the buyer creates the transaction details by entering them on the buyer's cellular communication device 110B under direction from the buyer's secure computing module 200B. The buyer then sends the transaction details along with the buyer's credentials from the buyer's secure computing module 200B to the seller's secure computing module 200S over the proximate-field wireless communication channel 245. In operation block 614, the seller reviews and approves the transaction details on the seller's cellular communication device 110S, adds the seller's credentials to the transaction details and digitally signs the financial purchase package with the seller's secure digital signature as explained above. The seller then sends the financial purchase package back to the buyer over the proximate-field wireless communication channel 245. In operation block 616, the buyer digitally signs the financial purchase package with the buyer's secure digital signature. The financial purchase package initiated by the buyer is now complete and optionally may be communicated back to the seller so the seller has a complete record of the financial purchase package.

If the seller initiates the financial transaction 600, operation block 602 indicates that the seller creates the transaction details by entering them on the seller's cellular communication device 110S under direction from the seller's secure computing module 200S. The seller then sends the transaction details along with the seller's credentials from the seller's secure computing module 200S to the buyer's secure computing module 200B over the proximate-field wireless communication channel 245. In operation block 604, the buyer reviews and approves the transaction details on the buyer's cellular communication device 110B, adds the buyer's credentials to the transaction details and digitally signs the financial purchase package with the buyer's secure digital signature as explained above. The buyer then sends the financial purchase package back to the seller over the proximate-field wireless communication channel 245. In operation block 606, the seller digitally signs the financial purchase package with the seller's secure digital signature. The financial purchase package initiated by the seller is now complete and optionally may be communicated back to the buyer so the buyer has a complete record of the financial purchase package.

If the seller or buyer does not approve and digitally sign the FPP, the process halts (not shown). If the transaction is to proceed, either the buyer or seller may send the financial purchase package on to a financial organization.

Decision block 620 determines if the seller is to communicate the FPP. If the seller communicates the financial purchase package, operation block 622 indicates that the seller sends the FPP to the seller's financial organization 300S over the cellular communication channel 112S. In operation block 624, the seller's financial organization 300S authenticates the seller by examining the seller's secure digital signature.

This authentication process performs a reverse hashing process on the seller's digital signature using the seller's secret key and determines that the transaction details are accurate, the transaction number identifier is correct, and that the seller's credentials match the seller's account with this financial organization.

The seller's financial organization 300S may then either approve or deny the transaction. If denied, the seller's financial organization 300S sends a message back to the seller's cellular communication device 110S and the transaction terminates (not shown). If approved, the seller's financial organization 300S sends the FPP and approval to the buyer's financial organization 300B through the network 150. In some cases, the buyer's financial organization 300B and the seller's financial organization 300S may be the same entity and there may be no need to "send" the FPP through the network 150.

In operation block 626, the buyer's financial organization 300B authenticates the buyer by examining the buyer's secure digital signature using the buyer's secret key in a manner similar to that described above for the authentication process of the seller. The buyer's financial organization 300B may then either approve or deny the transaction. If denied, the buyer's financial organization 300B sends a message to the buyer's cellular communication device 110B and the transaction terminates (not shown). If approved, the buyer's financial organization 300B transfers the funds to the seller's financial organization 300S.

Returning to decision block 620, if the buyer communicates the financial purchase package, operation block 632 indicates that the buyer sends the FPP to the buyer's financial organization 300B over the cellular communication channel 112B. In operation block 634, the buyer's financial organization 300B authenticates the buyer by examining the buyer's secure digital signature using the buyer's secret key as explained above.

The buyer's financial organization 300B may then either approve or deny the transaction. If denied, the buyer's financial organization 300B sends a message back to the buyer's cellular communication device 110B and the transaction terminates (not shown). If approved, the buyer's financial organization 300B sends the FPP and approval to the seller's financial organization 300S through the network 150. In some cases, the buyer's financial organization 300B and the seller's financial organization 300S may be the same entity and there may be no need to "send" the FPP through the network 150.

In operation block 636, the seller's financial organization 300S authenticates the seller by examining the seller's secure digital signature using the seller's secret key as explained above. The seller's financial organization 300S may then either approve or deny the transaction. If denied, the seller's financial organization 300S sends a message to the seller's cellular communication device 110S and the transaction terminates (not shown). If approved, the seller's financial organization 300S sends the approval back to the buyer's financial organization 300B. In operation block 638, the buyer's financial organization 300B transfers the funds to the seller's financial organization 300S. At this point in the process, the financial transaction 600 has been completed.

Decision block 640 determines whether the seller should be notified of the transaction results. If so, in operation block 642 the seller's financial organization 300S sends the transaction results to the seller's cellular communication device 100S.

If the seller is not to be notified, decision block 644 determines whether the buyer should be notified of the transaction results. If so, in operation block 646 the buyer's financial organization 300B sends the transaction results to the buyer's cellular communication device 110B and the process completes. If the buyer is not to be notified, the process completes.

In some embodiments, buyers and sellers may conduct financial transactions via an intermediary communication network such as the Internet rather than the cellular communication channel and proximate-field wireless communication channel. In such cases, the host devices 110 containing the secure computing module 200 may be more directly connected to the network 150. As a non-limiting example, a buyer using a cellular communication device 110 with a secure computing module 200 may connect to a website with a secure computing module 200. From the buyer's perspective, the transaction functions in a similar fashion as normal Internet purchasing. However, with purchasing through the secure computing modules 200 the secure payment process including secure digital signatures is significantly more secure when compared to the user simply entering a credit card number. The remote website with the secure computing module 200 may employ an enterprise version of the secure computing module 200 software, hardware, or combination thereof. This enterprise version creates a secure mechanism that is more robust for numerous continuous and simultaneous transactions. To ensure additional security between transactions, the enterprise software for the secure computing module 200 may zero out dynamic transaction memory between individual transactions.

In another related embodiment, a buyer using a cellular communication device 110 with a secure computing module 200 may connect to an Internet connected computer using a wired or wireless connection. The wireless connection may be through the proximate-field wireless communicator 240 of the secure computing module 200. Using this configuration, the buyer will use the Internet connected computer's web browser to select item(s) for purchase. During purchase, the buyer informs the website with a secure computing module 200 that the buyer will be using the buyer's locally attached secure computing module 200 to conduct the financial transaction. The website will then perform the transaction as described above using the website's secure computing module 200 and the enterprise software for the secure computing module 200.

In other related embodiments, the seller's secure computing module 200 may be configured as an unattended device and may accept financial transactions without financial organization verification. As a non-limiting example, it may be advisable to allow transactions in emergency situations (e.g., selling food during a power outage or computer down-time). As another non-limiting example, the seller may implement a store and forward type transaction, such as those performed by subway terminals. In these situations, the transactions are stored in a queue at the point of sale and authorized with the financial organization at a later time.

Although the present invention has been described with reference to particular embodiments, the present invention is not limited to these described embodiments. Rather, the present invention is limited only by the appended claims, which include within their scope all equivalent devices or methods that operate according to the principles of the present invention as described.

What is claimed is:

1. A method of performing a financial transaction using a buyer's secure computing module (SCM) commutatively coupled to a buyer's wireless communication device, the method comprising:
    receiving, by a processor resident in the buyer's SCM, financial transaction details for the financial transaction from the buyer's wireless communication device, the financial transaction details including a transaction amount for the execution of the financial transaction;
    generating by the processor resident in the buyer's SCM, a financial transaction package including the financial transaction details and credentials associated with the buyer;
    communicating, by a proximate-field wireless communicator resident in the buyer's SCM, the financial transaction package to a seller's SCM via a proximate-field wireless communication channel;
    receiving from the seller's SCM, by the proximate-field wireless communicator resident in the buyer's SCM via the proximate-field wireless communication channel, a request for an authorization of a funds transfer consistent with the transaction amount from a financial organization associated with the buyer to a financial organization associated with the seller;
    communicating, by the proximate-field wireless communicator resident in the buyer's SCM, an authorization for a transfer of funds from the financial organization associated with the buyer to the financial organization associated with the seller to the seller's SCM via the proximate-field wireless communication channel;
    receiving from the seller's SCM, by the proximate-field wireless communicator resident in the buyer's SCM via the proximate-field wireless communication channel, an acknowledgment of the funds transfer from the financial organization associated with the buyer to the financial organization associated with the seller; and
    providing, by the processor resident in the buyer's SCM, the acknowledgement to the buyer's wireless communication device.

2. The method of claim 1, further comprising encrypting at least one of the financial transaction details, the credentials associated with the buyer, and the financial transaction package prior to communicating the financial transaction package to the seller's SCM.

3. The method of claim 1, wherein the financial transaction details further comprise at least one of a transaction description and a seller's credentials.

4. The method of claim 1, further comprising:
    signing, by the processor resident in the buyer's SCM the financial transaction details with a buyer's secure digital signature by performing a secure hash function using a buyer's secret key on a message comprising the financial transaction details and a buyer's transaction number identifier.

5. The method of claim 1, wherein communicating via the proximate-field wireless communication channel comprises communicating using available radio frequencies, infrared frequencies, 802.1 a/b/g/n type wireless connections, Bluetooth, RFID, WiFi, WiMax, or combinations thereof.

6. The method of claim 1, further comprising:
    receiving, by the buyer's wireless communication device via a cellular communication channel, a result of the financial transaction.

7. A method of performing a financial transaction using a buyer's secure computing module (SCM) commutatively coupled to a buyer's wireless communication device, the method comprising:

receiving, by a processor resident in the buyer's SCM, financial transaction details for the financial transaction from the buyer's wireless communication device, the financial transaction details including a purchase price for an object of the financial transaction;

generating by the processor resident in the seller's SCM, a financial transaction package including the financial transaction details and credentials associated with the seller;

communicating, by a proximate-field wireless communicator resident in the seller's SCM, the financial transaction package to a buyer's SCM via a proximate-field wireless communication channel, communicating, by the proximate-field wireless communicator resident in the seller's SCM via the proximate-field wireless communication channel, a request for an authorization of a funds transfer consistent with the purchase price from a financial organization associated with the buyer to a financial organization associated with the seller;

receiving, by the proximate-field wireless communicator resident in the seller's SCM via the proximate-field wireless communication channel, an authorization for a transfer of funds consistent with the purchase price from the financial organization associated with the buyer to the financial organization associated with the seller from the buyer's SCM;

communicating, by the proximate-field wireless communicator resident in the seller's SCM via the proximate-field wireless communication channel, an acknowledgment of the funds transfer from the financial organization associated with the buyer to the financial organization associated with the seller to the buyer's SCM; and providing, by the processor resident in the seller's SCM, the acknowledgement to the seller's wireless communication device.

8. The method of claim 7, further comprising encrypting at least one of the financial transaction details, the credentials associated with the buyer, and the financial transaction package prior to communicating the financial transaction package to the seller's SCM.

9. The method of claim 7, wherein the financial transaction details further include comprise at least one of a transaction description and a buyer's credentials.

10. The method of claim 7, further comprising:
   signing the financial transaction details with a seller's secure digital signature by performing a secure hash function using a seller's secret key on a message comprising the financial transaction details and a seller's transaction number identifier.

11. The method of claim 7, wherein communicating via the proximate-field wireless communication channel comprises communicating using available radio frequencies, infrared frequencies, 802.1 a/b/g/n type wireless connections, Bluetooth, RFID, WiFi, WiMax, or combinations thereof.

12. The method of claim 7, further comprising:
   receiving, by at least one of the buyer's wireless communication device and the seller's wireless communication device via a cellular communication channel, a result of the financial transaction.

* * * * *